US008888887B2

(12) United States Patent
Hargrove et al.

(10) Patent No.: US 8,888,887 B2
(45) Date of Patent: *Nov. 18, 2014

(54) CROSS-LINKED MODIFIED WAXES FOR CONTROLLED RELEASE FERTILIZERS

(75) Inventors: Garrard Lee Hargrove, Birmingham, AL (US); Sriramakrishna Maruvada, Birmingham, AL (US); Robert Scott Wilson, Sterrett, AL (US); Nick Peter Wynnyk, Edmonton (CA); Baozhong Xing, Loveland, CO (US)

(73) Assignee: Agrium Advanced Technologies (U.S.) Inc., Loveland, CO (US)

( * ) Notice: Subject to any disclaimer, the term of this patent is extended or adjusted under 35 U.S.C. 154(b) by 178 days.

This patent is subject to a terminal disclaimer.

(21) Appl. No.: 13/291,663

(22) Filed: Nov. 8, 2011

(65) Prior Publication Data

US 2012/0111075 A1    May 10, 2012

Related U.S. Application Data

(60) Provisional application No. 61/412,246, filed on Nov. 10, 2010.

(51) Int. Cl.
| | | |
|---|---|---|
| C05C 9/00 | (2006.01) |
| C05C 1/00 | (2006.01) |
| C05C 5/02 | (2006.01) |
| C05C 11/00 | (2006.01) |
| C05B 7/00 | (2006.01) |
| C05D 9/00 | (2006.01) |
| C05D 9/02 | (2006.01) |
| C05G 3/00 | (2006.01) |

(52) U.S. Cl.
CPC ............ *C05G 3/0035* (2013.01); *C05G 3/0029* (2013.01)
USPC ............... 71/32; 71/28; 71/29; 71/30; 71/31; 71/33; 71/34; 71/48; 71/49; 71/50; 71/53; 71/54; 71/58; 71/59; 71/60; 71/61; 71/63; 71/64.07; 71/64.11

(58) Field of Classification Search
USPC .................... 71/64.07, 28–63, 64.11
See application file for complete search history.

(56) References Cited

U.S. PATENT DOCUMENTS

| | | |
|---|---|---|
| 4,711,659 A | 12/1987 | Moore |
| 4,804,403 A | 2/1989 | Moore |

(Continued)

FOREIGN PATENT DOCUMENTS

| | | |
|---|---|---|
| DE | 102008000595 | 9/2009 |
| JP | 2010-120785 | * 6/2010 |

(Continued)

OTHER PUBLICATIONS

Abstract, XP-002668211, Zhao et al., "Syntheses and properties of cross-linked polymers from functionalized triglycerides," Database Compendex, Accession No. E20084711713286, Journal of Applied Polymer Science, vol. 110, No. 2, Oct. 15, 2008, pp. 647-656.

(Continued)

*Primary Examiner* — Wayne Langel
(74) *Attorney, Agent, or Firm* — Kagan Binder, PLLC

(57) ABSTRACT

A controlled release fertilizer material comprising a particulate plant nutrient surrounded by a coating of a mixture including an isocyanate and a polyol, and further comprising a modified wax that may include a polyhydroxyl compound in which the wax and/or the polyhydroxyl compound are cross-linked with a sulfur or oxygen or a peroxide cross-linking moiety. In certain embodiments, the wax and polyhydroxyl compound are cross-linked at unsaturated sites in the wax or polyhydroxyl compound using heat, UV or ionizing radiation.

20 Claims, 1 Drawing Sheet

(56) References Cited

U.S. PATENT DOCUMENTS

| | | | |
|---|---|---|---|
| 5,213,723 | A | 5/1993 | Aoshima et al. |
| 5,374,292 | A | 12/1994 | Detrick |
| 5,538,531 | A * | 7/1996 | Hudson et al. .................. 71/28 |
| 5,599,374 | A | 2/1997 | Detrick |
| 5,803,946 | A * | 9/1998 | Petcavich et al. ............... 71/28 |
| 5,851,261 | A | 12/1998 | Markusch et al. |
| 6,039,781 | A | 3/2000 | Goertz et al. |
| 6,152,981 | A | 11/2000 | Markusch et al. |
| 6,176,891 | B1 | 1/2001 | Komoriya et al. |
| 6,231,633 | B1 | 5/2001 | Hirano et al. |
| 6,338,746 | B1 | 1/2002 | Detrick et al. |
| 6,358,296 | B1 | 3/2002 | Markusch et al. |
| 6,364,925 | B1 | 4/2002 | Markusch et al. |
| 6,663,686 | B1 * | 12/2003 | Geiger et al. .................... 71/28 |
| 7,267,707 | B2 * | 9/2007 | Rosenthal et al. ............ 71/64.11 |
| 7,771,505 | B2 | 8/2010 | Ogle et al. |
| 2004/0016276 | A1 * | 1/2004 | Wynnyk et al. ............. 71/64.11 |
| 2004/0020254 | A1 * | 2/2004 | Wynnyk et al. ............. 71/64.11 |
| 2006/0000252 | A1 | 1/2006 | Carstens et al. |
| 2010/0307211 | A1 * | 12/2010 | Xing et al. ....................... 71/27 |
| 2010/0326152 | A1 * | 12/2010 | Mente .............................. 71/27 |

FOREIGN PATENT DOCUMENTS

| | | | |
|---|---|---|---|
| WO | 97/48664 | | 12/1997 |
| WO | 2005/080325 | | 9/2005 |
| WO | 2007/016788 | * | 2/2007 |

OTHER PUBLICATIONS

International Search Report and Written Opinion, International Application No. PCT/ITS2011/059725, mailed Feb. 22, 2012, 14 pgs.

Schuchardt et al., "Transesterification of Vegetable Oils: a Review," J. Braz. Chem. Soc., vol. 9, No. 1, 199-210, 1998.

* cited by examiner

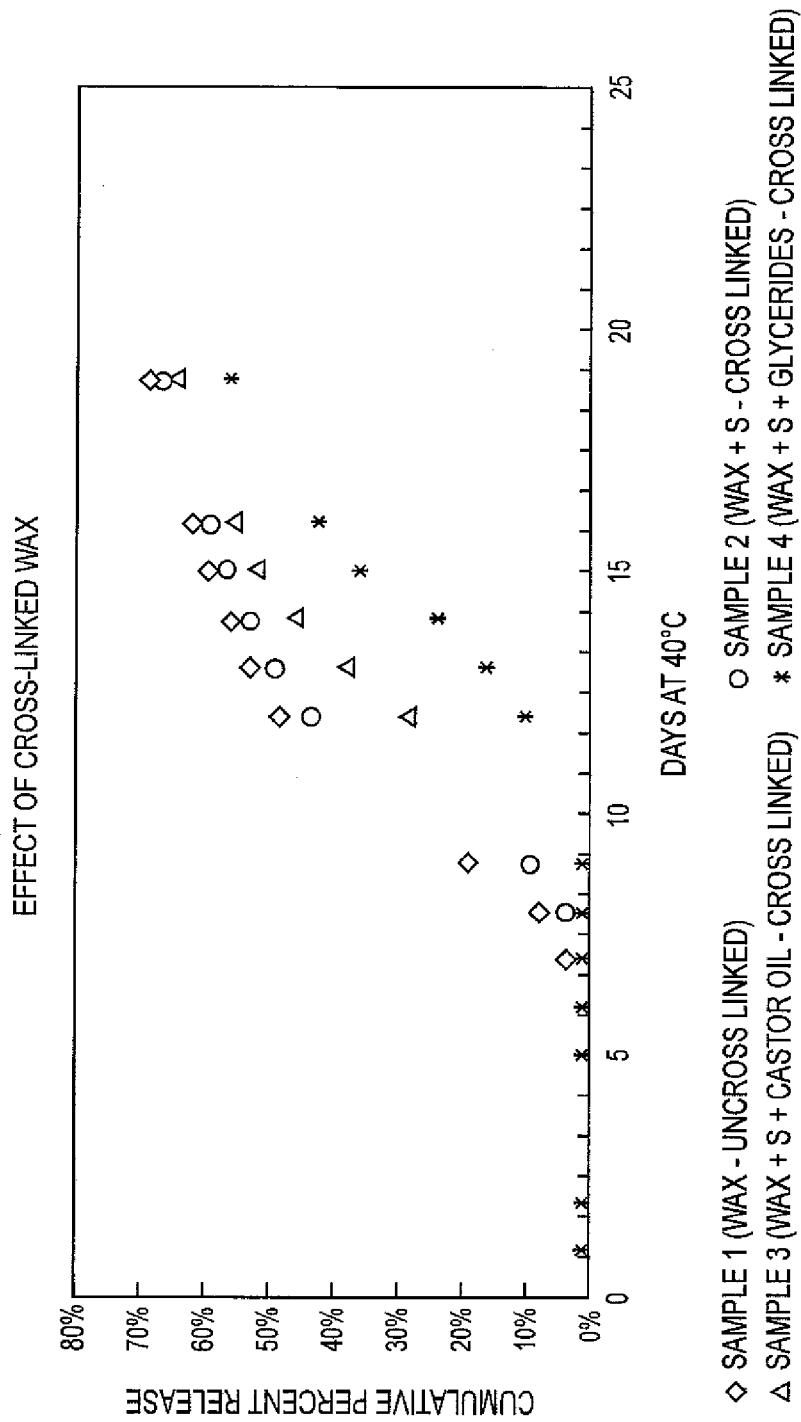

CROSS-LINKED MODIFIED WAXES FOR CONTROLLED RELEASE FERTILIZERS

CROSS REFERENCE TO RELATED APPLICATIONS

This application claims the benefit of U.S. Provisional application No. 61/412,246 filed Nov. 10, 2010 entitled "CROSS-LINKED MODIFIED WAXES FOR CONTROLLED RELEASE FERTILIZERS", the entire disclosure of which is incorporated herein.

The present invention relates to controlled release fertilizers such as those disclosed in U.S. Pat. Nos. 7,771,505 and 6,663,686, both of which are incorporated herein by reference in their entirety for all purposes. Additionally, the present application is related to the following co-owned and co-pending applications: U.S. Ser. No. 13/291,681 which claims priority to U.S. Provisional application No. 61/412,251 entitled CONTROLLED RELEASE FERTILIZERS MADE FROM CROSS-LINKED GLYCERIDE MIXTURES, and U.S. Ser. No. 13/291,698 which claims priority to U.S. Provisional application No. 61/412,264 entitled CROSS-LINKED POLYOLS FOR CONTROLLED RELEASE FERTILIZERS, both filed on even date herewith, and all of which are incorporated hereby by reference in their entireties for all purposes.

TECHNICAL FIELD

The present invention relates to controlled release fertilizers. More particularly, the present invention relates to a controlled release fertilizer material comprising a particulate plant nutrient surrounded by a coating.

BACKGROUND

Fertilizers have been used for many years to supplement nutrients in growing media. In recent years the art has focused on techniques to deliver controlled amounts of plant nutrients to the soil or other growing media. It is recognized, for example, that controlling the release of plant nutrients such as nitrogen from highly soluble fertilizer granules is desirable because releasing the nutrients over an extended period of time achieves advantages which include increased efficiency of fertilizer use by plants, reduced application costs since fewer applications of fertilizer are required and reduced nutrient loss caused by leaching and denitrification.

U.S. Pat. No. 5,538,531 (Hudson) teaches a controlled release, particulate fertilizer product having a water soluble fertilizer central mass encased in a plurality of water insoluble, abrasion resistant coatings. At least one inner coating is a urethane reaction product derived from reacting recited isocyanates and polyols. The outer coating is formed from an organic wax.

U.S. Pat No. 6,358,296 (Markusch et al.) teaches a slow-release polyurethane encapsulated fertilizer using oleo polyol(s). U.S. Pat. No. 5,851,261 (Markusch et al.) provides a process for the production of polyurea encapsulated fertilizer particles comprising applying an isocyanate-reactive component containing at least two amine groups to the fertilizer particles, and applying a polyisocyanate to the amine coated particles to form polyurea coated particles.

Sulfur containing isocyanate compositions and a process for the production of encapsulated fertilizer compositions are described in U.S. Pat. No. 6,152,981 (Markusch et al.). The fertilizer compositions are prepared by applying a mixture of sulfur and an isocyanate to the fertilizer and then applying an isocyanate-reactive material. U.S. Pat. No. 5,599,374 (Detrick) describes a fertilizer composition wherein a sulfur coating is applied to a fertilizer core, and thereafter a polymer coating is applied over the sulfur.

U.S. Pat No. 6,231,633 (Hirano et al.) teaches a granular fertilizer coated with a thermosetting resin coating that may be urethane and a hydrophobic compound, which may be wax. U.S. Pat. No. 6,663,686 (Geiger et al.) teaches a slow-release polyurethane encapsulated fertilizer using polyurethane and wax.

U.S. Pat. No. 6,039,781 (Goertz et al.) teaches that it is also known in the art to pre-coat particulate plant nutrient with organic oil and particles as a means to improve the release profiles of the particulate plant nutrient.

U.S. Pat. No. 6,338,746 (Detrick et al.) describes a process of first coating a fertilizer with a polymer, then coating the polymer with sulfur and thereafter applying a polymer coating. The polymers are described in U.S. Pat. Nos. 4,711,659 (Moore), 4,804,403 (Moore) and 5,374,292 (Detrick). These polymers require that the substrate contains a minimum quantity of reactive —$NH_2$ groups. Thus, these are not applicable to all fertilizer compositions for which slow release properties may be desirable.

Although polymer coated fertilizers as above described have received substantial attention, they are expensive to manufacture. There is a need in the art to provide controlled released fertilizer formulations that are abrasion resistant, and that reduce the cost of fertilizer production. Additionally, it would be desirable to have a controlled release fertilizer and process for production thereof which would allow for the ready customization of the release rate profile of a given particulate plant nutrient having applied thereto a given amount of urethane coating(s). It would also be desirable to be able to achieve a desirable release rate profile for a given particulate plant nutrient using significantly reduced amounts of coating materials.

SUMMARY

According to various embodiments, the present invention is a controlled release fertilizer composition including a plant nutrient coated with a reaction product of a mixture including an isocyanate and a polyol. The reaction mixture also includes a modified wax. In certain embodiments the modified wax is an unsaturated wax component that is cross-linked with sulfur, oxygen and/or a peroxide cross-linking moiety. In other embodiments, the modified wax is a mixture or a combination of an unsaturated wax component and a polyhydroxyl compound that is cross-linked with sulfur, oxygen, and/or a peroxide cross-linking moiety. In still other embodiments, the modified wax is cross-linked, either with itself or with a polyhydroxyl compound, at unsaturated sites by using heat, UV or ionizing radiation.

In some embodiments, the present invention is a controlled release fertilizer including a coated plant nutrient in which the coating contains a modified wax such as a cross-linked alpha olefin wax.

In some embodiments, the present invention is a controlled release fertilizer composition including a modified wax that is a cross-linked combination of an alpha olefin wax and a polyhydroxyl compound such as castor oil.

In still other embodiments, the present invention is a method of producing a controlled release fertilizer containing a modified wax.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 1 illustrates the release rate profile of a controlled release fertilizer containing different modified waxes having various cross-linked coating components in accordance with the present invention.

DETAILED DESCRIPTION

Controlled release fertilizers containing a modified wax, such as a cross-linked alpha olefin wax, a cross-linked combination of a wax and polyhydroxyl compound, or a cross-linked polyhydroxyl compound, demonstrate a more controlled release rate when compared to controlled release fertilizers of similar composition containing the same wax, polyhydroxyl compound or combination that is not cross-linked.

According to various embodiments, the present invention is a controlled release fertilizer composition including a plant nutrient coated with a reaction product of a mixture including an isocyanate and a polyol. This reaction mixture also includes a modified wax. In certain embodiments the modified wax is an unsaturated wax component that is cross-linked with sulfur, oxygen, and/or a peroxide cross-linking moiety. In other embodiments, the modified wax is a mixture or a combination of an unsaturated wax component and a polyhydroxyl compound that is cross-linked with sulfur, oxygen, and/or a peroxide cross-linking moiety. In still other embodiments, the modified wax is cross-linked, either with itself or with a polyhydroxyl compound, at unsaturated sites by using heat, UV or ionizing radiation.

According to various embodiments, the present invention is a controlled release fertilizer composition including a plant nutrient coated with a reaction product of a mixture including an isocyanate and a polyol. In some embodiments, the mixture includes a modified wax, wherein the wax is cross-linked with sulfur, oxygen, and/or a peroxide cross-linking moiety. In some embodiments, the present invention is a controlled release fertilizer composition including a plant nutrient coated with a reaction product of a mixture including an isocyanate, a polyol and a modified wax including a polyhydroxyl compound in which the wax and/or the polyhydroxyl compound are cross-linked with a sulfur, oxygen, and/or a peroxide cross-linking moiety. In certain embodiments, the polyhydroxyl compound and wax can be cross-linked at unsaturated sites in the polyhydroxyl compound or wax using heat, UV or ionizing radiation.

In some embodiments, the present invention is a controlled release fertilizer composition including a cross-linked combination of a polyhydroxyl compound, such as castor oil or a mixture of mono- and/or diglycerides, and an alpha olefin wax.

Plant Nutrient Material

The choice of particulate plant nutrient material useful for the present controlled release fertilizer material is not to be restricted. The present fertilizer material has been described primarily with reference to urea as the plant nutrient. As will be apparent to one skilled in the art, however, other nutrients, including primary nutrients, secondary nutrients and micronutrients, can be used to prepare the controlled release fertilizer compositions in accordance with the present invention. Typically, the plant nutrient material is provided in the form of a water soluble particulate material. The plant nutrient present within the controlled release fertilizer according to the various embodiments of the present invention, as described herein, can include primary nutrients such as urea, ammonium nitrate, potassium nitrate, ammonium phosphates and other suitable nitrogen derivatives; potassium phosphates and other suitable phosphorus derivatives; and potassium nitrate, potassium sulfate, potassium chloride and other suitable potassium derivatives as well as mixtures of these primary nutrients.

Additionally, the plant nutrient can include a suitable secondary nutrients and micronutrients. Suitable micronutrients include, but are not limited to iron sulfates, copper sulfate, manganese sulfate, zinc sulfate, boric acid, sodium molybdate and its derivatives, magnesium sulfate, potassium/magnesium sulfate, and derivatives and mixtures thereof.

Urea is characterized as having functional reactive groups at the surface of the urea which may be used to react with a diisocyanate when forming the polymer layer. This reaction causes the polymer layer to be chemically bonded to the urea. However, according to the present invention, it is not required that the polymer layer be bonded to the urea material.

The amounts of nutrients present within the controlled release fertilizer composition as describe herein may vary as follows, where the listed amounts are weight percentages based on the weight of the fertilizer composition:
Nitrogen derivatives (as Nitrogen): 0 wt. %-45.54 wt. %
Phosphorus derivatives (as $P_2O_5$): 0 wt. %-51.48 wt. %
Potassium derivatives (as $K_2O$): 0 wt. %-61.38 wt. %
Iron Sulfate: 0 wt. %-99 wt. %
Iron EDTA chelate: 0 wt. %-99 wt. %
Copper Sulfate: 0 wt. %-99 wt. %
Manganese Sulfate: 0 wt. %-99 wt. %
Zinc Sulfate: 0 wt. %-99 wt. %
Sodium Molybdate: 0 wt. %-99 wt. %
Sodium Borate: 0 wt. %-99 wt. %, and/or
Magnesium Sulfate: 0 wt. %-99 wt. %.

In some embodiments, the coating surrounds the plant nutrient core in an amount ranging from about 1.0 to about 20 wt. %, particularly from 1.0 to about 10 wt. %, more particularly from about 1.5 to about 5.0 wt. %, and most particularly from about 2.0 to about 4.0 wt. %, based on the weight of the plant nutrient material.

Isocyanate

The isocyanate used to produce the coating according to the various embodiments of the present invention is not to be restricted. Isocyanates contain two or more —NCO groups available for reaction and, as known to one skilled in the art, are widely used in the production of urethane polymers. Generally, the isocyanate compound suitable for use may be represented by the general formula:

$$Q(NCO)_i$$

wherein i is an integer of 2 or more and Q is an organic radical having the valence of i. Q may be a substituted or unsubstituted hydrocarbon group (e.g. an alkylene or arylene group). Moreover, Q may be represented by the general formula:

$$Q^1—Z—Q^1$$

wherein $Q^1$ is an alkylene or arylene group and Z is chosen from the group comprising —O—, —O—$Q^1$—, —CO—, —S—, —S—$Q^1$—S— and $SO_2$—. Examples of isocyanate compounds which fall within the scope of this definition include hexamethylene diisocyanate, 1,8-diisocyanato-p-methane, xylyl diisocyanate, $(OCNCH_2CH_2CH_2OCH_2O)_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenyhnethane-4,4',4"-triisocyanate and isopropylbenzene-alpha-4-diisocyanate.

In another embodiment, Q may also represent a polyurethane radical having a valence of i. In this case $Q(NCO)_i$ is a compound which is commonly referred to in the art as a prepolymer. Generally, a prepolymer may be prepared by reacting a stoichiometric excess of an isocyanate compound with an active hydrogen-containing compound such as, for example, the polyhydroxyl-containing materials or polyols, as they are commonly referred to, discussed below. In this embodiment, the polyisocyanate may be, for example, used in proportions of from about 30 percent to about 200 percent stoichiometric excess with respect to the proportion of hydroxyl in the polyol.

In another embodiment, the isocyanate compound suitable for use in the process of the present invention may be selected from dimers and trimers of isocyanates and diisocyanates, and from polymeric diisocyanates having the general formula:

$$[Q'(NCO)_i]_j$$

wherein both i and j are integers having a value of 2 or more, and Q' is a polyfunctional organic radical, and/or, as additional components in the reaction mixture, compounds having the general formula:

$$L(NCO)i$$

wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a =Si—NCO group, isocyanate compounds derived from sulphonamides ($QSO_2NCO$), cyanic acid and thiocyanic acid.

Additional non-limiting examples of suitable isocyanates include: 1,6-hexamethylene diisocyanate, 1,4-butylene diisocyanate, furfurylidene diisocyanate, 2,4-toluene diisocyanate (TDI), 2,6-toluene diisocyanate (2,6-TDI), 2,4'-diphenylmethane diisocyanate, 4,4'-diphenylmethane diisocyanate (MDI), 4,4'-diphenylpropane diisocyanate, 4,4'-diphenyl-3,3'-dimethyl methane diisocyanate, 1,5-naphthalenediisocyanate, 1-methyl-2,4-diisocyanate-5-chlorobenzene,2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitoluene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof. In one embodiment, the isocyanate used to produce the coating is 2,4-toluene diisocyanate (TDI). In another embodiment, the isocyanate used to produce the coating is 4,4'-diphenylmethane diisocyanate (MDI). Other suitable isocyanates are described in U.S. Pat. No. 6,364,925 (Markusch et al.), which is incorporated herein by reference in its entirety for all purposes. In some embodiments, the isocyanate can be an isomeric, oligomeric, monomeric, or polymeric form of a diphenylmethane diisocyanate or a toluene diisocyanate.

When used to react with the isocyanate in the mixture, the polyol and isocyanate are used in amounts such that the ratio of NCO groups in the isocyanate to the hydroxyl groups in the polyol is in the range of from about 0.8 to about 3.0, more particularly from about 0.8 to about 2.0, most particularly from about 0.8 to about 1.5.

Polyols and Polyhydroxyl Compounds

A polyhydroxyl compound is a compound containing two or more hydroxyl groups available for reaction and includes those compounds typically referred to as polyols. The choice of polyol is not particularly restricted. The polyol may be any hydroxyl-containing compound, or a mixture of different hydroxyl-containing compounds including, but not limited to polyether, polyester, epoxy, polycarbonate, polydiene and polycaprolactone. In some embodiments, the polyol compound is used as a modifier in the reaction mixture, in which case, for the purposes of this application, it is then referred to as a polyhydroxyl compound. Non-limiting examples of polyhydroxyl compounds and polyols suitable for use in the controlled released fertilizers according to the various embodiments of the present invention include hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols and polyalkyleneether triols. Additional non-limiting examples of suitable polyols are those described in U.S. Pat. No. 4,804,403 to Moore (see, for example; column 9, lines 3-20, and example 1 which is incorporated herein by reference in its entirety for all purposes). Further non-limiting examples of polyhydroxyl compounds and polyols suitable for use in the various embodiments of the present invention include diethylene glycol polyol, ethylene glycol, polypropylene glycol, organic polyols, for example as described in U.S. Pat. No. 4,804,403 to Moore, orthophathalate diethylene glycol based polyester polyols, terephthalate-diethylene glycol based polyester polyols, castor oil and oils modified to contain amine or OH groups, for example modified tung oil, soybean oil, canola oil, sunflower oil, linseed oil, e.g. U.S. Pat. No. 6,364,925 to Markusch et al. (see, for example column 8 line 39 to column 9, line 27 and the examples); and U.S. Pat. No. 6,358,296 to Markusch et al. (see, for example column 9 lines 1 to 13, and the examples; which are all incorporated herein by reference), oleo-polyols, for example an epoxidized castor oil, epoxidized sunflower oil, epoxidized linseed oil as described in U.S. Pat. No. 6,358,296 to Markusch et al. (which is incorporated herein by reference in its entirety for all purposes), polyether polyols, castor oil derivatives for example partial hydrolysates of castor oil, by reacting castor oil with a polyol selected from diols (e.g. ethylene glycol, propylene glycol, 1,4-butanediol, neopentyl glycol, 1,6-hexanediol, diethylene glycol, dipropylene glycol, polyethylene glycol, and polypropylene glycol), glycerol, trimethylolpropane, and polyether polyol, or esters formed by reactions between ricinoleic acid and the polyol selected from these compounds as described in U.S. Pat. No. 6,176,891 to Komoriya et al. (see, for example column 7 lines 4 to 16, column 8, lines 49 to 62; which is incorporated herein by reference in its entirety for all purposes), or combinations thereof.

Additionally, the polyhydroxyl compound or polyol may be derived from natural sources such as soybean, corn, canola, sunflower, safflower, and the like. Vegetable oil derived polyols are also sometimes referred to as oleo polyols or triglycerides. According to some embodiments of the present invention, the polyol is an oleo polyol. In some embodiments, the polyol includes reaction products of glycerol and vegetable oils and/or animal fats including soybean oil, sunflower oil, canola oil, corn oil, safflower oil, tall oil, tallow, lard and mixtures thereof.

In other embodiments of the invention, the polyol is a mixture of monoglycerides and/or diglycerides formed by reacting a triglyceride and/or diglyceride with any aliphatic, or aromatic, saturated, or unsaturated, natural, or synthetic, liquid, or solid, monofunctional, difunctional, trifunctional, or polyfunctional hydroxyl compound including, but not limited to: methanol, ethanol, propanol, isopropanol, butanol, isobutanol, pentanol, propenol, propynol, butane diol, butenediol, butynediol, ethylene glycol, diethylene glycol, triethylene glycol, propanediol, dipropylene glycol, polyethylene glycol, polypropylene glycol, trimethylol propane, pentaerythritol, caprolactone polyols, carbonate polyols, ethanolamine, diethanolamine, triethanolamine, tetra (2-hydroxypropyl) ethylenediamine, sorbitol, simple and/or complex sugars and the like.

In certain embodiments, the polyol used in the present invention is a mixture of cross-linked mono- and/or diglycerides having a normalized viscosity in a range of 1-50, where the normalized viscosity is determined as a ratio of the measured viscosity of the cross-linked mixture over the measured viscosity, of the uncross-linked mixture.

According to some embodiments of the present invention the polyhydroxyl compound or polyol is a catalytic reaction product of glycerol and triglycerides and is cross-linked with sulfur. A variety of catalytic reagents can be used to catalyze the reaction between the glycerol and the triglyceride to produce a glyceride mixture. Suitable catalysts include acids, bases, organic, inorganic or biologically active compounds, examples of which include, but are not limited to the following: strong bases such as sodium hydroxide, strong acids such as sulfuric and sulfonic acids, p-toluene sulfonic acid, metal alkoxides, aluminum isopropoxide, tetraalkoxytitanium compounds such as tetraisopropyl titanate, organotin alkoxides, lithium ricinoleate, zinc acetate, sodium carbonate, potassium carbonate, hydrolytic enzymes such as lipase, nonionic base catalysts such as amines, guanidines and many others listed in an article entitled "Transesterification of Vegetable Oils: a Review" by Ulf Schuchardt et al, J. Braz. Chem. Soc., Vol. 9, No. 1, 199-210, 1998, which is incorporated herein by reference in its entirety for all purposes.

According to other embodiments of the present invention the polyhydroxyl compound or polyol is a catalytic reaction product of glycerol and triglycerides and is cross-linked with oxygen or a peroxide cross-linking moiety. U.S. Pat. No. 5,213,723 to Aoshima et al., which is incorporated herein by reference in its entirety for all purposes, provides a list of peroxide cross-linking agents suitable for use with the various embodiments of the present invention as described herein. Exemplary suitable peroxide cross-linking agents include, but are not limited to, the following benzoyl peroxide, 2,4, dichlorobenzoyl peroxide, dicumyl peroxide, 1,3-bis(t-butylperoxyisopropyl)benzene, 2,5-dimethyl-2,5-di(t-butylperoxy)hexane, 1,1-di-t-butylperoxy-3,3,5-trimethylcyclohexane, cumene hydroperoxide, di-t-butyl peroxide, t-butylcumyl peroxide, p-chlorobenzoyl peroxide, t-butyl peroxybenzoate, and t-butylperoxyisopropyl carbonate.

Wax

The modified wax used to produce the coating according to the various embodiments of the present invention may be a single type of wax or a mixture of different waxes. For example, the wax may be selected from an intermediate petroleum wax, an alpha olefin wax, a polyethylene wax, a paraffin wax, a silicone wax, a slack wax, a microcrystalline wax, natural waxes, natural oils, partially hydrogenated oils, or fats. In some embodiments, the wax is an oxidized or "cooked" wax. In certain embodiments, the wax is a $C_{30+}$ alpha olefin wax. Non-limiting examples of waxes that may be used in the compositions of the controlled release fertilizer of the present invention include those described in U.S. Pat. No. 5,538,531 to Hudson (see, for example column 5, lines 13 to 27 and the examples; which is incorporated herein by reference in its entirety for all purposes. The wax may comprise a drop melting point temperature greater than 50° C., or between about 60° C. and 90° C., or any temperature therebetween, for example 60, 62, 64, 66, 68, 70, 72, 74, 76, 78, 80, 82, 84, 86, 88, 90° C. Representative waxes and their melting points are listed in the table below.

| Wax Type | Melting Point (° C.) |
| --- | --- |
| $C_{30+}$ wax (100%) | 64.0 |
| $C_{30+}$ wax (95%) x-linked with 5% sulfur | 68.5 |
| $C_{30+}$ wax (80%) x-linked with castor oil (10%) and sulfur (10%) | 66.8 |
| $C_{30+}$ wax (80%) x-linked with Soybean oil (10%) and sulfur (10%) | 62.0 |
| $C_{30+}$ wax (80%) x-linked with canola oil glycerides (10%) and sulfur (10%) | 66.3 |
| $C_{30+}$ wax (80%) x-linked with Soybean oil (10%) and sulfur (10%) | 62.0 |
| Partially hydrogenated castor oil (95%) x-linked with 5% sulfur | 89.8 |
| Partially hydrogenated Soybean oil (95%) x-linked with 5% sulfur | 54.2 |

In some embodiments, the wax is an alpha olefin wax. In certain embodiments, the wax is a $C_{30+}$ alpha olefin wax. In still certain other embodiments, the wax is cross-linked alpha-olefin wax. In one embodiment, the wax is a cross-linked alpha-olefin wax having from 22 to 35 carbons. In one embodiment, the wax is a cross-linked $C_{30+}$ alpha olefin wax. The cross-linked alpha olefin wax can be cross-linked with either sulfur, oxygen, and/or a peroxide cross-linking moiety. U.S. Pat. No. 5,213,723 to Aoshima et al., which is incorporated herein by reference in its entirety for all purposes, provides a list of peroxide cross-linking agents suitable for use with the various embodiments of the present invention as described herein. Exemplary suitable peroxide cross-linking agents include, but are not limited to, the following benzoyl peroxide, 2, 4, dichlorobenzoyl peroxide, dicumyl peroxide, 1,3-bis(t-butylperoxyisopropyl)benzene, 2,5-dimethyl-2,5-di(t-butylperoxy)hexane, 1,1-di-t-butylperoxy-3,3,5-trimethylcyclohexane, cumene hydroperoxide, di-t-butyl peroxide, t-butylcumyl peroxide, p-chlorobenzoyl peroxide, t-butyl peroxybenzoate, and t-butylperoxyisopropyl carbonate.

In some embodiments, an alpha olefin wax is pre-mixed with a polyhydroxyl compound to produce a mixture or combination that is then cross-linked. In one embodiment, the polyhydroxyl compound is castor oil. The mixture can then be cross-linked with sulfur, oxygen, and/or a peroxide cross-linking moiety.

According to various embodiments, the modified wax is present in the mixture in an amount of up to about 50 wt. %, based on the combined weight of the wax and the polyhydroxyl compound. More particularly, the modified wax is present in the mixture in an amount in the range of from about 1.0 to about 25 wt. %, based on the combined weight of the wax and the polyhydroxyl compound. Most particularly, the modified wax is present in the mixture in an amount in the range of from about 2.0 to about 10 wt. % based on the combined weight of the wax and the polyhydroxyl compound.

A process for producing the controlled release fertilizers according to the various embodiments of the present invention includes the step of cross-linking a wax, alone or combined with polyhydroxyl compound, to provide a modified wax. In a further step, a particulate plant nutrient is contacted with a mixture including an isocyanate, a polyol, and a modified wax to provide a coated particulate plant nutrient followed by curing the coated particulate plant nutrient to provide a controlled release fertilizer.

In one embodiment, the process includes contacting glycerol with a triglyceride in the presence of a catalyst to provide a mixture of one or more monoglycerides and/or diglycerides. In some embodiments, the mixture of monoglycerides and/or diglycerides is cross-linked.

The precise mode of applying the mixture including the polyol, such as a cross-linked monoglyceride and/or diglyceride, isocyanate and a modified wax to the plant nutrient is not particularly restricted. In some embodiments, the step of applying the mixture to the particulate plant nutrient includes contacting the particulate plant nutrient with a first stream comprising the polyol and a second stream comprising the isocyanate, the first stream and the second stream being independent of one another. In one embodiment, the first stream can include a mixture of the polyol and the modified wax. In this embodiment, the particulate plant nutrient may be contacted simultaneously with the first stream and the second stream. In another embodiment, the particulate plant nutrient is initially contacted with the first stream followed by the second stream. In still other embodiments, the coating process is repeated at least once to produce a controlled release fertilizer material having a plurality of coating layers.

In still other embodiments of manufacturing a controlled release fertilizer, urea granules of known weight are charged into a rotary drum reactor. Chemicals needed for certain target coating weight are measured and kept ready. The coating process includes the step of heating the urea in the rotating drum reactor to a target temperature (typically anywhere from 50° C. to 90° C.) followed by multiple chemical applications. The time delay between the chemical applications, also referred to as layer timing, is typically kept constant. The first layer includes triethanolamine (TEA) and MDI. The second, third and fourth layers are identical, and are made up of the reaction product of a polyol mixture and MDI. Before the fourth layer, a small amount of slightly oxidized wax is added to prevent caking or agglomeration. The polyol mixture used in the second, third and fourth layers can include QUADROL polyol (tetra(2-hydroxypropyl)ethylenediamine) as the catalyst, and a modified wax, such as cross-linked $C_{30+}$HA alpha-olefin wax. The catalyst and modified wax each make up about 5% of the mixture, with the remainder being the polyol. During the application of chemicals, the rotary drum reactor is kept at a constant temperature. Once all the chemicals are applied and reaction is complete, the granules are allowed to cool to ambient temperature.

Selected Particular Embodiments

One particular embodiment of this disclosure is a controlled release fertilizer composition that has a plant nutrient coated with a reaction product of an isocyanate, a polyol and a modified wax, wherein the modified wax is cross-linked. The modified wax can include a cross-linked olefin wax, such as a $C_{30+}$ alpha olefin wax. The wax may be cross-linked with sulfur, oxygen, and/or a peroxide cross-linking moiety. The modified wax can cross-linked at unsaturated sites in the wax using heat, UV or ionizing radiation.

An alternate particular embodiment of this disclosure is a controlled release fertilizer composition that has a plant nutrient coated with a mixture that includes a reaction product of an isocyanate and a polyol, and a modified wax, wherein the modified wax is cross-linked. The modified wax can include a cross-linked olefin wax, such as a $C_{30+}$ alpha olefin wax. The wax may be cross-linked with sulfur, oxygen, and/or a peroxide cross-linking moiety. The modified wax can cross-linked at unsaturated sites in the wax using heat, UV or ionizing radiation.

Yet another alternate particular embodiment of this disclosure is a controlled release fertilizer composition that has a plant nutrient coated with a reaction product of a mixture including an isocyanate and a polyol, the reaction product also comprising a modified wax, wherein the modified wax is a cross-linked mixture of wax and a polyhydroxyl compound. The modified wax can include a cross-linked olefin wax, such as a $C_{30+}$ alpha olefin wax. The mixture of the wax and the polyhydroxyl compound may be cross-linked with sulfur, oxygen, and/or a peroxide cross-linking moiety. The mixture of the modified wax and the polyhydroxyl compound can be cross-linked at unsaturated sites in the wax using heat, UV or ionizing radiation.

Still another alternate particular embodiment of this disclosure is a controlled release fertilizer composition that has a plant nutrient coated with a reaction product of a mixture including an isocyanate and a polyol, the reaction product also comprising a modified wax, wherein the modified wax is a cross-linked polyhydroxyl compound. The polyhydroxyl compound may be cross-linked with sulfur, oxygen, and/or a peroxide cross-linking moiety. The polyhydroxyl compound can be cross-linked at unsaturated sites in the wax using heat, UV or ionizing radiation.

For any of the embodiments, the modified wax can include alpha olefin waxes, silicone waxes, oxidized waxes, natural waxes, natural oils, partially hydrogenated oils, or fats. In some embodiments, the polyol can include castor oil and the modified wax includes an alpha olefin wax cross-linked with sulfur. Alternately, the modified wax can be a cross-linked mixture of a wax and a polyhydroxyl compound. Alternately, for any of these embodiments, the modified wax can be a cross-linked polyhydroxyl compound, such as cross-linked castor oil or a cross-linked mixture of mono- and/or diglycerides.

The plant nutrient can be at one nutrient from the nutrients listed below at the levels listed:
Nitrogen derivatives (as Nitrogen): 0 wt. %-45.54 wt. %
Phosphorus derivatives (as $P_2O_5$): 0 least wt. %-51.48 wt. %
Potassium derivatives (as $K_2O$): 0 wt. %-61.38 wt. %
Iron Sulfate: 0 wt. %-99 wt. %
Iron EDTA chelate: 0 wt. %-99 wt. %
Copper Sulfate: 0 wt. %-99 wt. %
Manganese Sulfate: 0 wt. %-99 wt. %
Zinc Sulfate: 0 wt. %-99 wt. %
Sodium Molybdate: 0 wt. %-99 wt. %
Sodium Borate: 0 wt. %-99 wt. % and/or
Magnesium Sulfate: 0 wt. %-99 wt. %.

The listed amounts of nutrients are weight percentages based on the weight of the controlled release fertilizer composition.

The plant nutrient may be particulate.

The isocyanate can be a diphenylmethane diisocyanate and/or a toluene diisocyanate including any isomeric, oligomeric, monomeric, or polymeric forms thereof.

The coating can be present in an amount in the range of about 1-20 wt. % based on the weight of the coated plant nutrient. In some embodiments, the coating is present in an amount in the range of about 1-10 wt. % based on the weight of the coated particulate plant nutrient, or in an amount in the range of about 2-10 wt. % or about 2-4 wt. % based on the weight of the coated particulate plant nutrient.

In some embodiments, a ratio of NCO groups from the isocyanate to the hydroxyl groups in the polyol in the mixture is in the range of about 0.8 to about 3.0, or about 0.8 to about 2.0, or about 0.8 to about 1.5.

In those embodiments where the wax is cross-linked with sulfur, oxygen, and/or a peroxide cross-linking moiety, the amount of cross-linked sulfur, oxygen or peroxide moieties can be up to about 25 wt. % based on the weight of the mixture of polyol and modified wax, up to about 10 wt. %, or up to about 5 wt. %.

Another particular embodiment of this disclosure is a process of producing a controlled release fertilizer. One process includes contacting a wax, a polyhydroxyl compound or a mixture of a wax and a polyhydroxyl compound with cross-linking agent to provide a modified wax; contacting a plant nutrient with a mixture comprising the modified wax, an isocyanate, and a polyol to provide a coated plant nutrient, and curing the coated plant nutrient to provide the controlled release fertilizer. Another process includes contacting a mixture of castor oil and an olefin wax with a cross-linking agent to produce a cross-linked mixture of castor oil and the olefin wax, wherein the castor oil and the olefin wax are cross-linked; contacting a plant nutrient with a mixture comprising the cross-linked castor oil and olefin wax, a polyol and an isocyanate to provide a coated plant nutrient, and curing the coated plant nutrient to provide the controlled release fertilizer. In both processes, the cross-linking agent comprises sulfur, oxygen, and/or a peroxide cross-linking moiety. The plant nutrient may be particulate.

EXAMPLES

Example 1

Cross-linked Wax Preparation Method

Alpha olefin wax ($C_{30+}$ HA) from CP Chemicals and elemental sulfur are used as raw materials.

A mixture containing 95 wt. % $C_{30+}$HA wax and 5 wt. % sulfur was heated from room temperature to 160° C. with stirring at 450 rpm. Once the mixture reached the target temperature, heating and stirring was continued for one hour. Under these conditions, elemental sulfur would cross-link the wax molecules and would be incorporated chemically into the mixture. At the end of one hour, the mixture was cooled to ambient temperature.

The modified wax obtained by above method is used along with the rest of reactants to create a polyurethane coating on urea.

Sample 1: CRF made with pristine $C_{30+}$ HA wax (no sulfur cross-linking) with a coating weight (coating weight/fertilizer plus coating weight) of 3.0 wt. %

Sample 2: CRF made with sulfur cross-linked $C_{30+}$HA with coating weight (coating weight/fertilizer plus coating weight) of 3.0 wt. %

Results and Discussion:

TABLE 1

Viscosity measurements at 85° C. for wax samples

| Sample Description | Viscosity (cP) |
|---|---|
| Pristine wax | 17 |
| Wax oxidized for 1 hour without sulfur | 20 |
| Wax cross-linked with 5 wt. % sulfur for 1 hour | 64 |

It was discovered that a significant increase in viscosity for the sulfur containing wax confirmed that cross-linking reaction indeed had occurred.

Example 2

Drop Test:

In this test, 30 grams of CRF (Coated urea) granules were dropped from a height of 20 feet onto a metal plate in a 4 inch diameter tube. This is representative of what the CRF granules are likely to experience during handling, transportation and blending prior to the application in a field.

Water Release:

Water release measurements were taken at two different temperatures (20° C. and 40° C.) for samples from Example 1; before and after the drop test. The higher temperature test is an accelerated release test. The data are presented in Tables 2 and 3 below.

TABLE 2

Cumulative percent release values measured in water at 20° C.

|  |  | Days at 20° C. | | | | | | |
|---|---|---|---|---|---|---|---|---|
|  |  | 1 | 4 | 7 | 14 | 21 | 28 | 35 |
| Sample 1 | Before Drop | 2.9 | 5.0 | 7.2 | 12.2 | 15.9 | 20.3 | 24.0 |
|  | After Drop | 5.7 | 13.7 | 19.6 | 28.5 | 36.0 | 41.4 | 46.0 |
| Sample 2 | Before Drop | 1.4 | 2.1 | 2.9 | 4.3 | 6.4 | 8.6 | 11.5 |
|  | After Drop | 4.3 | 10.8 | 14.4 | 21.0 | 25.5 | 30.0 | 33.0 |

TABLE 3

Cumulative percent release values measured in water at 40° C.

|  |  | Days at 40° C. | | | | | | |
|---|---|---|---|---|---|---|---|---|
|  |  | 1 | 2 | 3 | 4 | 5 | 6 | 7 | 8 |
| Sample 1 | Before Drop | 2.1 |  |  | 9.3 | 11.5 | 14.4 | 17.3 | 20.3 |
|  | After Drop | 8.6 | 14.4 |  |  | 30.7 | 36.0 | 39.9 | 44.5 |
| Sample 2 | Before Drop | 1.4 |  |  | 4.3 | 6.4 | 8.6 | 11.5 | 15.9 |
|  | After Drop | 5.7 | 8.6 |  |  | 18.1 | 21.8 | 24.7 | 27.7 |

The release at 20° C. after 35 days for the before drop sample was 11.5% for sulfur cross-linked samples vs. 24% for the control sample. After the drop test, which is indicative of handling damage, the release for sulfur cross-linked sample was 33%, which was significantly lower than 46% for the control sample. Similar differences in release were also observed at 40° C. between the sulfur cross-linked and non-sulfur cross-linked samples.

Results and Discussion

At the same overall coating weight, the CRF containing a modified wax (wax cross-linked with sulfur) will have longer release life vs. the control. Alternatively, a lower coating weight can be used to match longevities to the control. This invention provides an additional variable that can be changed to design product that can deliver nutrient release profiles to match with farmer, or grower's crop nutritional needs.

Example 3

Cross-Linking Process Reaction Variables:

It should be noted that the sulfur cross-linking reaction can be carried out at temperatures ranging from 120° C. to 200° C. Reaction times can range from as low as 15 minutes to more than 6 hours. Numerous combinations of temperature-time exist that may result in an acceptable reaction product. While the examples presented above use one hour as the reaction time and 160° C. as the temperature, people skilled in the art would understand that different combination of the above two variables can give the same result. Similarly the examples use sulfur as a cross-linking agent. Other cross-linking agents that can effectively cross link at a double bond are equally suitable to carry out this reaction. While the sulfur content chosen was 5 wt. %, it can range from about 0.01 wt. % to about 25 wt. %.

Example 4

Cumulative percent release values were measured in water at 40° C. for four different samples.

Sample 1: Neat $C_{30+}$ HA wax is used at 5 wt. % loading in the polyol mixture.

Sample 2: 95 wt. % $C_{30+}$ HA wax is cross-linked with 5 wt. % sulfur. The resulting modified wax is used at 5 wt. % loading in the polyol mixture.

Sample 3: 80 wt. % $C_{30+}$ HA wax is cross-linked with 10 wt. % sulfur and 10 wt. % castor oil. The resulting modified wax is used at 5 wt. % in the polyol mixture.

Sample 4: 80 wt. % $C_{30+}$ HA wax is cross-linked with 10 wt. % sulfur and 10 wt. % mono/diglyceride (mono:di=55:45) mixture from Canola oil.

FIG. 1 illustrates the effect of the modified wax on the release rate for the four different CRF samples described above.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

What is claimed is:

1. A controlled release fertilizer composition including a plant nutrient coated with a polyurethane reaction product of a mixture including an isocyanate and a polyol and comprising a modified wax, wherein the modified wax is cross-linked.

2. The controlled release fertilizer of claim 1, wherein the modified wax is cross-linked with sulfur, oxygen, and/or a peroxide cross-linking moiety.

3. The controlled release fertilizer of claim 2, wherein the amount of cross-linked sulfur, oxygen or peroxide moieties is up to about 25 wt. % based on the weight of the mixture of the modified wax.

4. The controlled release fertilizer of claim 2, wherein the amount of cross-linked sulfur, oxygen or peroxide moieties is up to about 5 wt. % based on the weight of the mixture of the modified wax.

5. The controlled release fertilizer of claim 1, wherein the coating is present in an amount in the range of about 1-20 wt. % based on the weight of the coated plant nutrient.

6. The controlled release fertilizer of claim 1, wherein the coating is present in an amount in the range of about 2-10 wt. % based on the weight of the coated particulate plant nutrient.

7. The controlled release fertilizer of claim 1, wherein the modified wax is a cross-linked mixture of a wax and a polyhydroxyl compound.

8. The controlled release fertilizer of claim 7, wherein the mixture of the wax and the polyhydroxyl compound are cross-linked with sulfur, oxygen, and/or a peroxide cross-linking moiety.

9. The controlled release fertilizer of claim 7, wherein the coating is present in an amount in the range of about 1-20 wt. % based on the weight of the coated plant nutrient.

10. The controlled release fertilizer of claim 1, wherein the modified wax is a cross-linked polyhydroxyl compound.

11. The controlled release fertilizer of claim 10, wherein the polyhydroxyl compound is cross-linked with sulfur, oxygen, and/or a peroxide cross-linking moiety.

12. The controlled release fertilizer of claim 10, wherein the modified wax comprises cross-linked castor oil or a cross-linked mixture of mono- and/or diglycerides.

13. The controlled release fertilizer of claim 10, wherein the coating is present in an amount in the range of about 1-20 wt. % based on the weight of the coated plant nutrient.

14. The controlled release fertilizer of claim 1, wherein the modified wax comprises olefin wax, silicone wax, oxidized wax, natural wax, natural oil, partially hydrogenated oil, or fat.

15. The controlled release fertilizer of claim 1, wherein the wax comprises a $C_{30+}$ alpha olefin wax.

16. The controlled release fertilizer of claim 1, wherein the plant nutrient comprises at least one nutrient from the nutrients listed below:

Nitrogen derivatives (as Nitrogen): 0 wt. %-45.54 wt. %
Phosphorus derivatives (as $P_2O_5$): 0 wt. %-51.48 wt. %
Potassium derivatives (as $K_2O$): 0 wt. %-61.38 wt. %
Iron Sulfate: 0 wt. %-99 wt. %
Iron EDTA chelate: 0 wt. %-99 wt. %
Copper Sulfate: 0 wt. %-99 wt. %
Manganese Sulfate: 0 wt. %-99 wt. %
Zinc Sulfate: 0 wt. %-99 wt. %
Sodium Molybdate: 0 wt. %-99 wt. %
Sodium Borate: 0 wt. %-99 wt. % and/or
Magnesium Sulfate: 0 wt. %-99 wt. %, wherein the listed amounts of nutrients are weight percentages based on the weight of the controlled release fertilizer composition.

17. The controlled release fertilizer of claim 1, wherein a ratio of NCO groups from the isocyanate to the hydroxyl groups in the polyol in the mixture is in the range of about 0.8 to about 3.0.

18. The controlled release fertilizer of claim 1, wherein a ratio of NCO groups from the isocyanate to the hydroxyl groups in the polyol in the mixture is in the range of about 0.8 to about 1.5.

19. A process of producing a controlled release fertilizer comprising the steps of:
contacting a wax, a polyhydroxyl compound or a mixture of a wax and a polyhydroxyl compound with cross-linking agent comprising sulfur, oxygen, and/or a peroxide cross-linking moiety to provide a modified wax;
contacting a particulate plant nutrient with a mixture comprising the modified wax, and a polyurethane reaction product mixture including an isocyanate and a polyol to provide a polyurethane coated particulate plant nutrient, and
curing the coated particulate plant nutrient to provide the controlled release fertilizer.

20. A process of producing a controlled release fertilizer comprising the steps of:
contacting a mixture of castor oil and an olefin wax with a cross-linking agent comprising sulfur, oxygen, and/or a peroxide moiety to produce a cross-linked mixture of castor oil and the olefin wax, wherein the castor oil and the olefin wax are cross-linked with either sulfur, oxygen, or the peroxide cross-linking moiety;
contacting a particulate plant nutrient with a mixture comprising the cross-linked castor oil and olefin wax, and a polyurethane reaction product mixture including a polyol and an isocyanate to provide a polyurethane coated particulate plant nutrient, and curing the polyurethane coated particulate plant nutrient to provide the controlled release fertilizer.

* * * * *